United States Patent
Oksman et al.

(10) Patent No.: US 9,300,596 B2
(45) Date of Patent: Mar. 29, 2016

(54) METHOD OF PACKET ENCAPSULATION FOR MULTI-SERVICE OPERATION FROM A DISTRIBUTION POINT

(71) Applicant: Lantiq Deutschland GmbH, Neubiberg (DE)

(72) Inventors: Vladimir Oksman, Morganville, NJ (US); Dietmar Schoppmeier, Unterhaching (DE); Stefan Uhlemann, Munich (DE)

(73) Assignee: Lantiq Beteiligungs-GmbH & Co.KG, Neubiberg (DE)

( * ) Notice: Subject to any disclaimer, the term of this patent is extended or adjusted under 35 U.S.C. 154(b) by 121 days.

(21) Appl. No.: 14/064,480

(22) Filed: Oct. 28, 2013

(65) Prior Publication Data

US 2014/0119386 A1    May 1, 2014

Related U.S. Application Data

(60) Provisional application No. 61/719,455, filed on Oct. 28, 2012.

(51) Int. Cl.
*H04J 3/24* (2006.01)
*H04L 12/931* (2013.01)
*H04L 12/28* (2006.01)

(52) U.S. Cl.
CPC ............ *H04L 49/00* (2013.01); *H04L 12/2885* (2013.01)

(58) Field of Classification Search
CPC .... H04L 12/931; H04L 49/00; H04L 12/2885
USPC ........................................................ 370/474
See application file for complete search history.

(56) References Cited

U.S. PATENT DOCUMENTS

| | | | | |
|---|---|---|---|---|
| 5,351,239 | A * | 9/1994 | Black et al. | 370/476 |
| 2010/0185791 | A1 * | 7/2010 | Pons et al. | 710/30 |
| 2011/0145870 | A1 * | 6/2011 | Ramaswami et al. | 725/98 |
| 2014/0241378 | A1 * | 8/2014 | Vanderhaegen et al. | 370/465 |

* cited by examiner

*Primary Examiner* — Sai-Ming Chan

(57) ABSTRACT

The present disclosure relates to a communication system which, in accordance with one exemplary embodiment, a communication network for providing network services to at least one network device and at least one distribution point (DP) coupled to at least one network backbone. The at least one network device is located remote from the DP and coupled to the at least one network backbone via the at least one DP. The at least one DP is configured to receive a plurality of data units from the at least one network backbone in accordance with one or more communication protocols. A plurality of data frames, each having a header portion and a payload portion, are generated and each one of the received data units are mapped into one or more payload portions of the plurality of data frames. One or more of the plurality of data frames are mapped to a payload portion of at least one data transfer unit (DTU), which is then communicated to the at least one network device. Furthermore, a corresponding method and an appropriate transceiver are described.

17 Claims, 4 Drawing Sheets

(a)

(b)

| Field | Bits | Description |
|---|---|---|
| Frame type | [7:6] | 00 – idle frame (carries a dummy packet); <br> 01 – short data frame; <br> 10, 11 – a 2-byte header (see Table 2) |
| Payload length | [5:0] | Length of the payload in bytes <br> - coded as unsigned integer for Idle frame <br> - coded as unsigned integer minus 1 for short data frame |

(a) 1-Byte header format

| Field | Bits | Description |
|---|---|---|
| Frame type | [15:13] | 100 – data frame; <br> 101 – management frame; <br> 110 – incomplete frame; <br> 111 – continuation of the frame <br> 000 to 011 – a 1-byte header (see Table 1) |
| Payload length | [12:0] | Length of the payload in bytes coded as unsigned integer |

(b) 2-Byte header format

Figure 5

METHOD OF PACKET ENCAPSULATION FOR MULTI-SERVICE OPERATION FROM A DISTRIBUTION POINT

CROSS-REFERENCE TO RELATED APPLICATIONS

This application claims the benefit of U.S. Provisional Application No. 61/719,455, filed Oct. 28, 2012.

BACKGROUND

The Digital Subscriber Line (DSL) technology, during all its history, attempted to increase the bit rate in the aim to deliver more broadband services to the customer. Unfortunately, copper loops deployed from the Central Office (CO) to customer premise equipment (CPE, also referred to as CPE devices which are located in the customer's premises) are rather long and do not allow transmission of data with bit rates more than few megabits per second (Mb/s). To increase the bit rates, modern access networks use street cabinets, MDU-cabinets (MDU=multi dwelling unit), and similar arrangements: cabinets are connected to the CO by a high-speed backbone communication line, like multi-gigabit passive optical network (GPON) and installed close to the customer premises. From these cabinets, high-speed DSL systems, such as Very-High-Bit-Rate DSL (VDSL), can be deployed. The current VDSL systems (ITU-T Recommendation G.993.2) have range of operation about one kilometer, providing bit rates in the range of tens of Mb/s. To increase the bit rate of VDSL systems deployed from the cabinet, recent ITU-T Recommendation G.993.5 defined vectored transmission that allows increasing bit rates up to 100 Mb/s per direction.

However, recent trends in the access communications market show that 100 Mb/s is still not sufficient and bit rates up to one gigabit per second (Gb/s) are required. Accordingly, further increase of the bit rate is one design goal for modern DSL systems, wherein bit rates of about 1 Gb/s are desired. This is implemented by bringing a high-capacity fiber into the neighborhood and connecting to this fiber backbone multiple distribution points (DPs), each serving a small customer area, typically of up to 200 meter around.

At each DP a certain number of services for the connected customer premises are branched out from the fiber backbone and conveyed via the copper lines served by the DP to the CPE. These different services branched by the DP out of the fiber backbone may use different communication protocols, such as Ethernet, ATM, UDP, etc. The packets of data received at the DP from the fiber backbone are multiplexed and switched towards particular user CPEs, which are connected to the DP via twisted pair lines. The receiving CPEs are capable to recover each packet of each particular protocol and pass them to the associated application.

SUMMARY

A first aspect of the invention relates to a communication system. In accordance with one example of the invention the communication system includes a communication network for providing network services to at least one network device and at least one distribution point (DP) coupled to at least one network backbone. The at least one network device is located remote from the DP and coupled to the at least one network backbone via the at least one DP. The at least one DP is configured to receive a plurality of data units from the at least one network backbone in accordance with one or more communication protocols. A plurality of data frames, each having a header portion and a payload portion, are generated and each one of the received data units are mapped into one or more payload portions of the plurality of data frames. One or more of the plurality of data frames are mapped to a payload portion of at least one data transfer unit (DTU), which is then communicated to the at least one network device.

Another aspect of the invention relates to a method for interfacing at least one network backbone with at least one network device. In accordance to one example of the invention the method includes receiving a plurality of data units from the at least one network backbone in accordance with one or more communication protocols. A plurality of data frames, each having a header portion and a payload portion, are generated and each one of the received data units are mapped into one or more payload portions of the plurality of data frames. The method further includes mapping one or more of the plurality of data frames to a payload portion of at least one data transfer unit (DTU) and communicating the at least one DTU to the at least one network device.

A further aspect of the invention relates to a transceiver unit for interfacing at least one network backbone with at least one network device remote from the network device. In accordance with an exemplary embodiment the transceiver unit includes at least one first TPS-TC unit coupled to at least one network backbone and configured to receive a plurality of data units from the at least one network backbone in accordance with a first communication protocol. A plurality of data frames, each having a header portion and a payload portion, are generated and each one of the received data units are mapped into one or more payload portions of the plurality of data frames. The first TPS-TC unit is further configured to map one or more of the plurality of data frames to a payload portion of at least one data transfer unit (DTU) frame, which is then communicated to the at least one network device.

Still further, a system is described as another aspect of the invention. Accordingly, the system comprises a communication network medium and at least one node coupled to the medium; the node is arranged to communicate, at least in part via the medium, a frame that includes a header and a payload, the frame being associated with a payload portion of a transfer data unit (DTU). The header does not include Transport-Protocol-Specific Transmission-Convergence (TPS-TC) information. A corresponding method includes generating a frame, which includes a header and a payload. The frame is associated with a payload portion of a transfer data unit (DTU), wherein the header does not include Transport-Protocol-Specific Transmission-Convergence (TPC-TC) information. The method includes further transmitting the frame.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 5a is a table illustrating the coding of a 1-byte header used within a DTU payload section.

FIG. 5b is a table illustrating the coding of a 2-byte header used within a DTU payload section.

DETAILED DESCRIPTION

Figure 1:
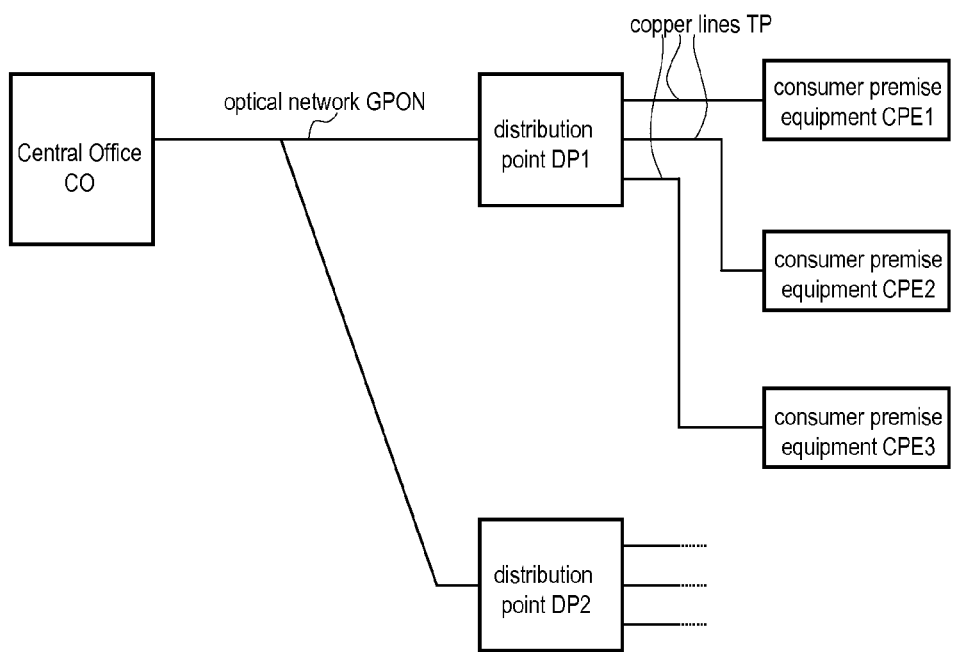
FIG. 1 illustrates an exemplary communication arrangement which employs one or more distribution points each connecting several consumer premises with a passive optical network.

FIG. 1 illustrates an exemplary communication arrangement, in which different embodiments of the present invention may be usefully employed. A central office CO of a communications network service provider is connected to one or more distribution points DP1, DP2 each of which may serve a plurality of consumer premise equipment devices CPE1, CPE2, CPE3. The distribution points DP1, DP2 are network nodes that are connected to the central office CO, e.g., using a passive optical network (PON), particularly a Gigabit Passive Optical Network GPON which typically allows upstream and downstream data rates of up to 2.5 gigabits per second. The DPs are connected with the CPE devices by commonly used twisted pair copper lines TP having a length of 200 meters or less (sometimes referred to as "local loop") in order to allow data rates of hundreds of megabits per second between the DP and the respective CPE device. The distribution point can be regarded as a kind of DSLAM (digital subscriber line access multiplexer) which is a commonly used network device that connects multiple customer digital subscriber line (DSL) interfaces (between DSLAM and CPEs) to a high-speed digital communications channel (a GPON in the present example) using multiplexing techniques.

Furthermore, the DPs may be enabled to communicate with the CPEs using any twisted pair high-speed communication technology, and, particularly, xDSL technology. Such xDSL technology may include High bit rate Digital Subscriber Line (HDSL), Asymmetric Digital Subscriber Line (ADSL2, ADSL2+), and especially the Very high speed DSL (VDSL2). In addition, in-home networking technologies operating over twisted pair lines, such as ITU-T G.hn and G.pnt (HomePNA), may also be used to serve CPEs from the DP. At each DP a certain number of services for the connected customer premises are branched out from the fiber backbone and conveyed via the copper lines TP served by the distribution points to the respective CPE devices. The DP branches different services out of the fiber backbone: the packets of data received from the fiber backbone are switched towards the particular user CPE, which are connected to the DP via a twisted pair line.

For communicating different services delivered by the fiber backbone (e.g. the GPON) over the twisted pair lines, the packets of data received from the fiber backbone are, in the DP, encapsulated into a special transport container that aligns the actual service bit rate with the bit rate used by the twisted pair lines connecting DP to the CPE devices. This procedure is commonly known as "bit rate adaptation" or rate "alignment". In particular deployments, fiber backbone technology may carry services using one or different transport protocols. Sometimes, a DP may be connected to two independent backbones delivering competing services (often called "unbundling"). Additionally, embedded operations channel (EOC) or another type of management channel is usually needed between the DP and each particular CPE device.

There are number of encapsulation methods currently used to perform rate adaptation between the backbone network (usually fiber) and the DSL system operating over a twisted pair. The ITU-T Recommendation G.992.3 defines an encapsulation of ATM cells onto a DSL frame. To align bit rates between DSL and backbone network, Idle ATM cells are inserted from time to time to fill up the gaps between two asynchronous clocks (of the backbone and of the DSL system).

IEEE 802.3 defines an encapsulation method called "64/65", which is currently also used in DSL and maps the incoming Ethernet packets onto 65-byte containers. Each container includes a 1-byte header and a 64-byte payload section (i.e. data-word). The header indicates how the bytes of incoming packets are mapped, i.e., what is the byte position of the start of the packet, the end of the packet, indicates idle container, data container, etc.

Another example is the well-known HDLC protocol (HDLC=High-level Data Link Control), in which the start and the end of each packet is indicated by special bytes called "Flag". To equalize bit rates between the backbone and the DSL, additional flags are inserted between active packets, thus filling up timing gaps.

One disadvantage of the mentioned solutions is that they all are intended to serve continuous transmission over the DSL, which uses frequency-division duplexing (FDD); with FDD upstream and downstream are transmitted simultaneously. By adding ATM idle cells (or idle bytes in a 64-byte container in case 64/65 encapsulation, or consecutive Flags in case of HDLC) the presented solutions provide transparency of the original system timing to the CPE, but obviously this entails a high additional overhead. The modern DPs copper lines deployed from the DP operate using Time Division Duplexing (TDD). With TDD, upstream and downstream are transmitted sequentially, not simultaneously. Therefore it is, anyway, not possible to achieve transparency of the original timing through the DSL line, and a new method is needed. This method should also reduce the unnecessary overhead.

The present encapsulation solutions provide encapsulation of one single service. The embodiments described herein allow an encapsulation method for a DP that can operate with DSL lines using both FDD, (with timing transparency possible) and TDD (with no timing transparency), but reduced overhead. Also, a solution for a multi-service case may be provided, in which user data could be communicated from sources using different transport protocols, plus data packets generated by the local management entity (i.e. a part of a DSL modem which manages the operation of the DSL lines) is accommodated. As such, the methods described herein are reliable, guarantee quality of service (QoS), allow flexible multiplexing of different transmission protocols and embedded operations channel, and minimize overhead. It may, if required, also provide timing transparency.

Figure 2:
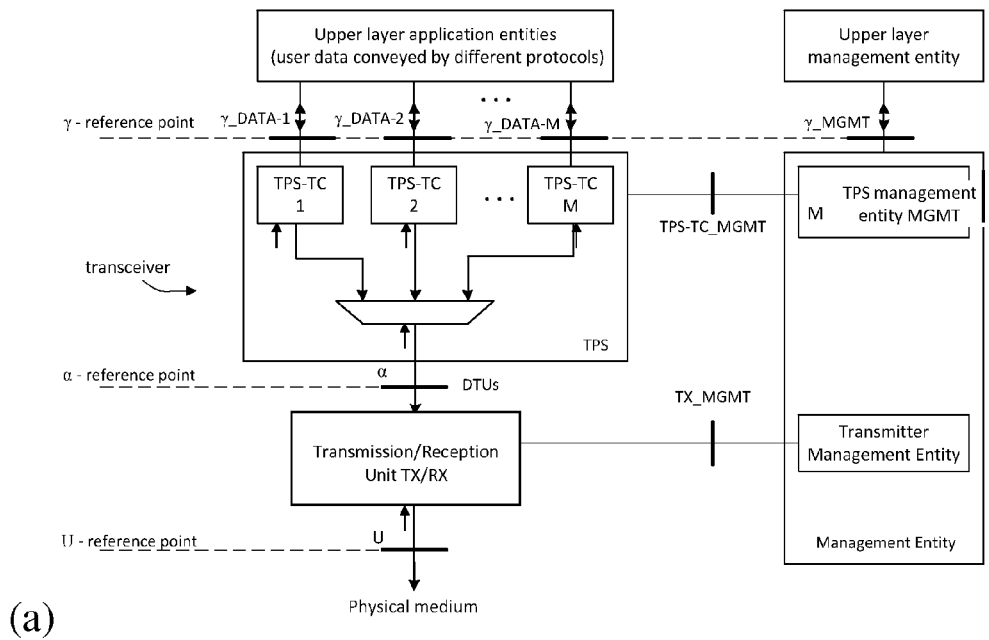
FIG. 2 illustrates one exemplary transceiver performing an encapsulation method in accordance with the present invention which may be employed within a distribution point.
Figure 2:
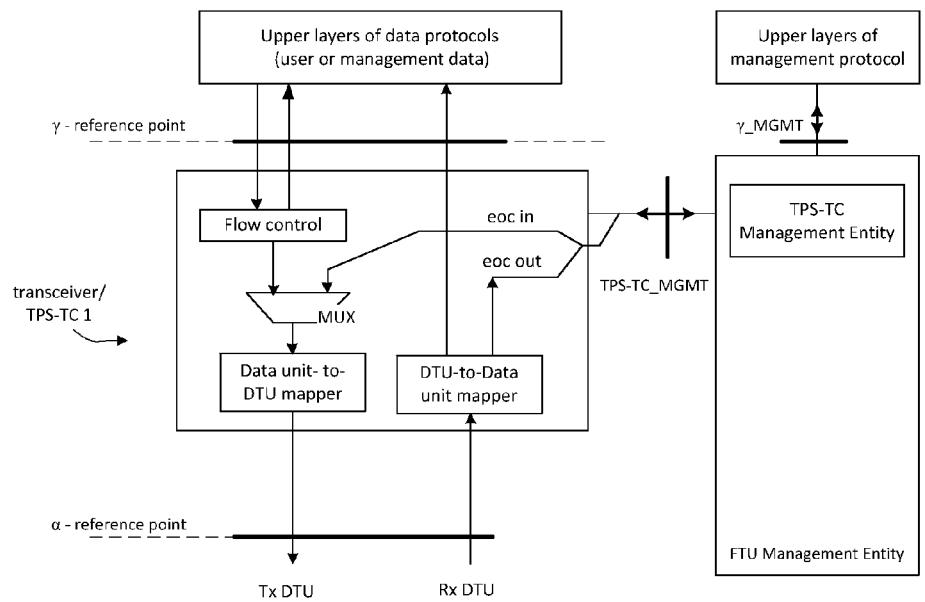
Figure 3:
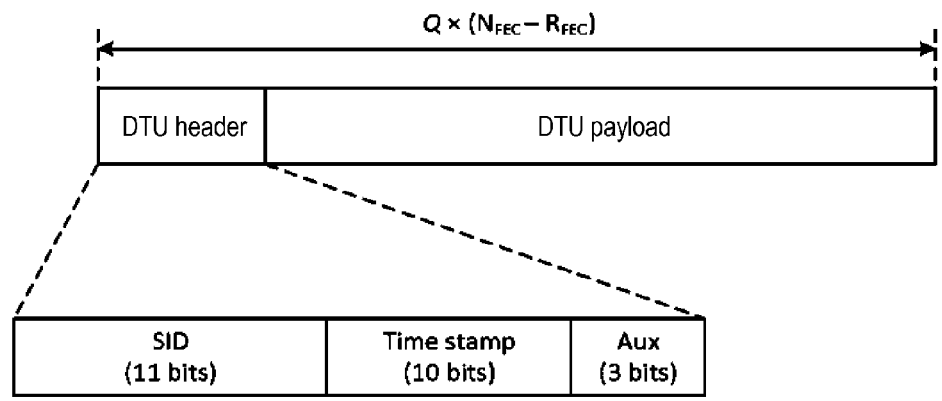
FIG. 3 illustrates the header section of a data transfer unit (DTU).

A generic functional model of a DP apparatus is illustrated, in an exemplary manner, using the diagrams of FIGS. 2a and 2b. FIG. 2a illustrates the DSL transceiver of the DP which serves a CPE device. A similar transceiver is included in the CPE device at the opposite end of the copper line. FIG. 2b illustrates a special case in which the transceiver includes only one TPS-TC unit. Furthermore, the TPS-TC unit is illustrated in more detail, specifically the multiplexing of user data packets with EOC packets (management data) prior to mapping both into a Data Transfer Unit (DTU), which is a kind of data frame having a header and a payload section referred to as DTU header and DTU payload, respectively. The DP may include one transceiver for each CPE device to be connected with the DP. Referring to FIG. 2a, a number of Transport Protocol Specific Transmission Convergence (TPS-TC) units (labeled "TPS-TC 1", "TPS-TC 2", . . . , "TPS-TC M" in the example of FIG. 2a) may be used to encapsulate incoming data units of different transmission protocols into the payload section of data units of a unified format that are referred to as Data Transfer Units (DTUs) as mentioned above. All DTUs used in a specific system may have the same (adjustable) size and format and are forwarded by the transmission/reception unit (labeled TX/RX in FIG. 2a) of the DSL system to the medium, e.g. a twisted pair line (see also FIG. 1, copper lines TP). The transmission unit TX encodes the incoming DTUs and modulates them onto sub-carriers of the OFDM (Orthogonal frequency-division multiplexing) or DMT (Discrete Multitone Transmission) modulator (OFDM and particularly DMT are standard modulation methods used in DSL systems). The encoding in some embodiments implies forward error correction (FEC), in particular Reed-Solomon encoding. The size of the DTU therefore is coordinated with the size of the FEC codeword, $N_{FEC}$, as shown in FIG. 3. The modulated signal is transmitted using Time Division Duplexing (TDD), which alternates between upstream and downstream transmission. The embodiments described herein may be also used in case of Frequency Division Duplexing (FDD), in which upstream and downstream transmissions use different groups of sub-carriers (different frequency bands).

Figure 4:
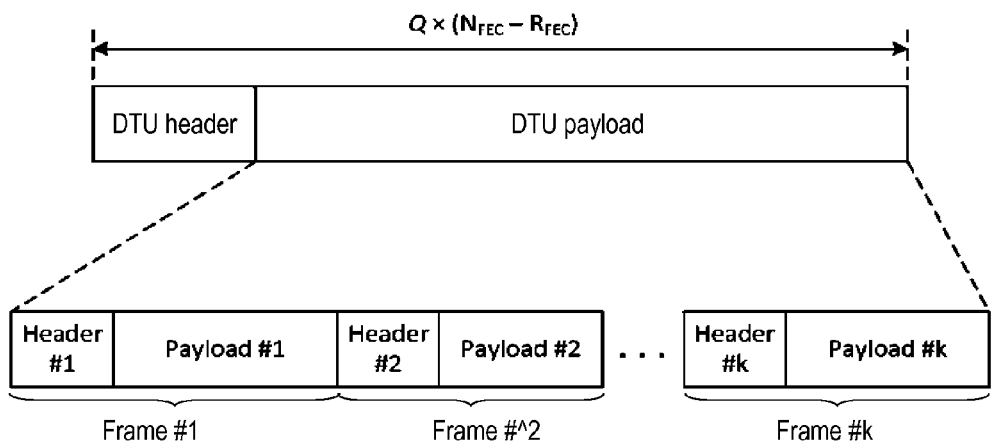
FIG. 4 illustrates the payload section of a DTU.

Specifically, FIGS. 2a and 2b illustrate a transceiver unit within a distribution point (DP). A corresponding transceiver is located in a CPE device. The transceiver includes a number of M TPS-TC units, each serving a particular transmission protocol sourced from the corresponding upper layer entity, e.g. an ATM network sourcing ATM cells in accordance with an ATM transmission protocol. It should be noted that, for the sake of simplicity of the illustration, FIG. 2b only shows one TPS-TC unit of the transceiver. In addition, an overhead management channel (also referred to as "embedded operations channel", short "EOC") is sourced from a TPS management entity MGMT, passed via the interface labeled TPS-TC MGMT, and multiplexed into DTUs, as particularly shown in FIG. 2b (see multiplexer MUX). Each TPS-TC unit (labelled TPS-TC 1, TPS-TC 1, . . . , TPS-TC M in the example of FIG. 2a) collects incoming data units at the corresponding γ-interface, converts them into frames having the mentioned unified format (see also FIG. 4), and multiplexes these frames into a DTU. The term γ-interface or γ-reference point is common term for an interface between the DSL transceiver (OSI layer 1) and the upper layers mentioned before (e.g. ATM layer for ATM, OSI layer 2 (MAC layer) for Ethernet, etc.). The stream of DTUs of unified format, which appears at a so-called a-interface or a-reference point, is encoded and modulated in the transmitter TX, and passed to the medium via a so-called U-interface. The term a-reference point is a common term denoting the interface between the Physical-Media-Specific (PMS) and the Transport-Protocol-Specific (TPS) Transmission-Convergence layers (TC). The U-reference point denotes the interface to the twisted pair copper lines. The receiver works in inverse way: it collects signals from the physical medium, demodulates, decodes the DTUs, and further the receiving TPS-TC extracts, from the received DTUs, the original data units as well as management overhead data (as shown in FIG. 2b), and passes them to the corresponding upper layer entity (at the γ-interface) and DP management entity (at the management interface TPS-TC_MGMT), respectively. To identify data units that belong to different protocols, each is multiplexed into a DTU with a corresponding Type-Flag that indicates the specific protocol. The Type-Flag may reside in the DTU header, particularly in the portion labeled "Aux" in FIG. 3. In another embodiment, the Type-Flag may be associated with a particular frame inside a DTU and reside in the header of this frame (see FIG. 4).

The generic DTU format at the α-interface includes the DTU header and the DTU payload sections, as illustrated in FIG. 3. This format shall be used by all types of TPS-TC. The total number of bytes of a DTU may be selected in different ways. In one embodiment, the number of bytes of a DTU shall fit the size of the codeword used to encode the DTU in the transmitter TX (see FIG. 2a). For instance, if $N_{FEC}$ is the size of the codeword used by the encoder (in the transmission unit TX) and $R_{FEC}$ is the number of redundancy bytes added by the encoder, the size of the DTU is: $N_{DTU}=Q\times(N_{FEC}-R_{FEC})$, where Q is an integer defining the number of codewords accommodated by one DTU. So usually the size $N_{DTU}$ of a DTU does not vary from one DTU to another throughout a communication system.

The DTU header section includes fields that provide generic information about the DTU: identify its serial number (SID), a Time Stamp to track the DTU, and an Auxiliary field (labeled "Aux", see FIG. 3) that may be used to identify different types of DTUs, if defined, or other relevant DTU-related information. The size of these fields is usually very small as compared with the size of the DTU. The format of DTU header section used in one embodiment is summarized in FIG. 3.

The DTU payload section includes the actual data units of different protocols conveyed by the DTU or, if no data is available for transmission, Idle units, or data units of the embedded operations channel (sourced from TPS management entity). The generic format of the DTU payload section is presented in FIG. 4. The DTU payload section includes of a number of data units of a unified format, also referred to as frames, each frame containing a header (labeled "Header #1" through "Header #k") and a payload portion (labeled "Payload #1" through "Payload #k"). Each frame carries one data unit from a particular source (from a particular TPS-TC) or a part of a data unit (if a data unit is split to accommodate its size). Summarizing the above, each TPS-TC, e.g. the TPS-TC 1 of FIG. 2b, is configured to collect incoming data units at the corresponding γ-interface, and to convert them (entirely or partially) into the mentioned unified format. That is, an incoming data unit (or part of it) is mapped to a payload portion (e.g. Payload #1) of a frame (e.g. Frame #1) and a corresponding header (e.g. Header #1) is generated. Several frames (Frame #1, Frame #2, . . . Frame #k) of the unified format are then accommodated within the DTU payload of a DTU.

The headers (Header #1, . . . , Header #k) of the frames (Frame #1, Frame #2, . . . Frame #k) may indicate one or more of the following kinds of information:
 the type of the frame (if there are different types of frames of the same TPS-TC, e.g. frames carrying user data or carrying eoc data);
 the length of the frame (in bytes or bits); and
 other auxiliary information.
If DTU incorporates data units from different TPS-TCs, the headers may also indicate the actual protocol that is used, such as ATM, Ethernet, PPPoE, etc.). Particularly, the frame type and the frame length are included in the headers (Header #1, . . . , Header #k, see also FIG. 5).

One special type of frame is Idle Frame that may be used to fill up time gaps between incoming data units or to pad an incomplete DTU (if necessary). Another special type of frame is Management Frame, which carries data units of the embedded operation channel.

The receiver uses the type of the frame (included in the header) to identify the corresponding TPS-TC, which further recovers the packet and directs the recovered packet to the corresponding γ-interface. The receiver uses the length of the frame (included in the header) to identify the boundaries of the frame payload.

The data included in the payload portion of the frame (Payload #1, . . . , Payload #k) may be a data unit (e.g. an ATM cell or an Ethernet packet) which is received at the γ-interface and which is encapsulated onto the DTU. The payload portions (Payload #1, . . . , Payload #k) of the frames (Frame #1, Frame #2, . . . Frame #k) can be:
- a unit of user data sourced by the corresponding TPS-TC;
- a set of dummy bits/bytes to fill up the time gap between data packets or pad the DTU;
- a unit of management data (from embedded operations channel)

In one embodiment, only one TPS-TC unit is utilized (such as in the example illustrated in FIG. 2b), and the payload portions (Payload #1, Payload #2, . . . , Payload #k) can include one or more of the following: user data of a specific transport protocol served by this TPS-TC, management data, and idle (dummy) bytes.

In another embodiment, that utilizes one or more TPS-TC units, the frame header (Header #1, Header #2, . . . , Header #k) can be 1 byte or 2 bytes long and indicates:
- the type of the frame;
- the length of the frame payload in bytes.

Frames use 1 byte or 2 byte header for more efficiency:
- short frames (with 1-byte header);
- normal frames (with 2-byte header).

The length of the header is indicated by its particular coding (e.g. by the first bit of a header).

The coding of the 1-byte header and 2-byte header is described in Table (a) and Table (b), respectively, of FIG. 5. The number of bytes in the header depends on the frame type and is indicated using the first bit of the header ("0" for 1-byte header and "1" for 2-byte header). For idle frames and short data frames (64 bytes or shorter), a 1-byte header is used. Normal data frames (longer than 64 bytes) and management frames (if used) shall use a 2-byte header.

The main reason for 1-byte header is to achieve a minimum of 1-byte long idle frame (by assignment of zero-length payload). This 1-byte Idle frame may be used to implement 1-byte gap between frames carrying data and 1-byte padding of the DTU. Another reason is to provide an efficient way of conveying short data frames (up to 64 bytes) with only one byte of redundancy. A 2-byte header facilitates mapping of long packets.

The payload of each frame (Frame #1, Frame #2, . . . , Frame #k, see FIG. 4) includes an original packet of user data or a packet of management data, or a dummy (idle) packet. The latter contains all zeros and may be used to fill up time gaps between incoming packets. The minimum length of a dummy payload is 0 bytes.

The last frame (e.g. Frame #k in the example of FIG. 4) included in the DTU payload section may include an incomplete data packet or incomplete management packet. In this case, the type of this frame can be "Start of the incomplete frame", and the first frame in the payload section of the next DTU shall be "Continuation of the incomplete frame". The frame that carries the end of packet (data or management) has the type "End of the incomplete frame".

Long frames (e.g. Ethernet frames longer than 8192 bytes, so called jumbo-frames) shall be split into two or more parts. These parts shall be transmitted in consecutive frames; the first frame shall be "Start of incomplete frame" type, which is followed by one or more frames of "Continuation of the frame" type, followed by a frame of "End of the frame" type. A special type may also be defined for a part of the frame that starts in one of the previous DTUs and ends in one of the subsequent DTUs. This way, data packets of any length can be accommodated by one or more DTUs.

If a DTU includes only idle packets, it shall be marked in the Auxiliary field of the DTU header as "Idle DTU". Idle DTUs may be transmitted for padding purposes and shall not be retransmitted.

The order, in which user data packets are encapsulated into a DTU, shall be, in majority of applications, the same as the order, in which packets enter from γ-interface. Further, the order in which DTUs are sent to a TPS-TC unit shall provide time integrity of the transmitted user data, i.e., packets recovered by the peer TPS-TC unit shall be sent to the application entity via the γ-interface in the same order as they were received from the γ-interface at the transmit end.

Idle frame and management frame (if used) are identified at the receiver by the frame type. Empty frames (Idle frames) are discarded by the receiver. Management frames are forwarded to the TPS management entity MGMT via TPS-TC MGMT interface (see FIG. 2b).

In some embodiments using multiple TPS-TCs (see FIG. 2a), the frame types "Start of incomplete frame", "Continuation of the frame", and "End of the frame" may belong to the same or different type of TPS-TC. That is, the "Start of frame", "End of frame", and "Continuation of frame" types shall have an additional indication of the TPS-TC type, i.e. to which TPS-TC unit a specific frame belongs to in order to avoid connecting parts of different frames at the receive side.

In another embodiment, the DTU size is aligned (or closely aligned) with discrete multi-tone transmission (DMT) data symbol boundaries. This may be achieved by selecting the appropriate size of the codeword used by the encoder and adjusting the number of bits per DMT symbol. Vice versa, the DTU length may be set to a length suitable for the size of the codeword used by the encoder in the transmitter TX/RX (see also FIG. 2a). In another embodiment, the encoding of the DTU is performed using Reed-Solomon coding (i.e. using RS-codes) followed by an interleaver; the size of the codeword can be adjusted to fit the size of the symbol.

Exemplary implementations discussed herein may have various components collocated; however, it is to be appreciated that the various components of the arrangement may be located at distant portions of a distributed network, such as a communications network and/or the Internet, or within a dedicated secure, unsecured and/or encrypted arrangement. Thus, it should be appreciated that the components of the arrangements may be combined into one or more apparatuses, such as a modem, or collocated on a particular node of a distributed network, such as a telecommunications network. Moreover, it should be understood that the components of the described arrangements may be arranged at any location within a distributed network without affecting the operation of the arrangements. For example, the various components can be located in a Central Office modem (CO, ATU-C, VTU-0), a Customer Premises modem (CPE, ATU-R, VTU-R), an xDSL management device, or some combination thereof. Similarly, one or more functional portions of the arrangement may be distributed between a modem and an associated computing device.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hh transceiver, a MoCA® transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MoCA, G.hh, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

The implementations herein are described in terms of exemplary embodiments. However, it should be appreciated that individual aspects of the implantations may be separately claimed and one or more of the features of the various embodiments may be combined.

The invention claimed is:

1. A communication system comprising:
a communication network for providing network services to at least one network device; and
at least one distribution point (DP) coupled to at least one network backbone; the at least one network device being remote from the DP and coupled to the at least one network backbone via the at least one DP;
wherein the at least one DP is configured to receive a plurality of data units from the at least one network backbone in accordance with one or more communication protocols; plurality of data frames, each having a header portion and a payload portion, are generated and each one of the received data units are mapped into one or more payload portions of the plurality of data frames; and
wherein one or more of the plurality of data frames are mapped to a payload portion of at least one data transfer unit (DTU), which is then communicated to the at least one network device.

2. The communication system of claim 1, wherein the headers of the data frame(s) mapped into the DTU(s) do not include Transport-Protocol-Specific Transmission-Convergence (TPS-TC) information.

3. The communication system of claim 1, wherein each DTU being composed of a DTU header and the DTU payload portion, the DTU header portion including at least one of the following: time-stamp; serial number, and DTU type information.

4. The communication system of claim 3, wherein each DTU header includes TPS-TC information associated with the frames included in the DTU payload.

5. The communication system of claim 1, wherein the DP is further configured to map management data frames to the payload portion of a DTU.

6. The communication system of claim 1, wherein the DP is further configured to map an idle frame to the payload portion of a DTU; an idle frame being composed of a header and a zero length payload.

7. The communication system of claim 1, wherein the header portions of the frames, which are mapped into the DTUs, include information about the type of the data included in the respective payload portions.

8. The communication system of claim 7, wherein the type of the data information included in the header portions is indicative as to whether the frame is one of the following: a data frame, a management frame, the first frame of a series of incomplete frames, a continuation frame of a series of incomplete frames, and the last frame of a series of incomplete frames.

9. The communication system of claim 1, wherein the header portions of the frames, which are mapped into the DTUs, include information about the lengths of the respective payload portions.

10. The communication system of claim 9, wherein the length of the header portions is either one byte or two bytes.

11. The communication system of claim 9, wherein one bit of the header portions is indicative whether the respective frame to be mapped into a DTU includes a short header or a long byte header.

12. The communication system of claim 1, wherein the DP includes a plurality of TPS-TC units, each receiving from the network backbone, in accordance with a particular transmission protocol, the data units to be mapped to payload portions of data frames, which are then mapped to DTUs.

13. A transceiver unit for interfacing at least one network backbone with at least one network device remote from the network device; the transceiver unit comprising:
at least one first Transport-Protocol-Specific Transmission-Convergence (TPS-TC) unit coupled to at least one network backbone and configured to receive a plurality of data units from the at least one network backbone in accordance with a first communication protocol; a plurality of data frames, each having a header portion and a payload portion, are generated and each one of the received data units are mapped into one or more payload portions of the plurality of data frames; and
wherein the first TPS-TC unit is further configured to map one or more of the plurality of data frames to a payload portion of at least one data transfer unit (DTU) frame, which is then communicated to the at least one network device.

14. The transceiver unit of claim 13 further comprising:
at least one second TPS-TC unit coupled to the at least one network backbone and configured to receive a plurality of data units from the at least one network backbone in accordance with a second communication protocol; a plurality of data frames, each having a header portion and a payload portion, are generated and each one of the received data units are mapped into one or more payload portions of the plurality of data frames; and
wherein the first and the second TPS-TC unit are further configured to map the plurality of data frames to payload portions of data transfer unit (DTU) frames, which are then communicated to the at least one network device, a header portion of each one of the DTUs includes TPS-TC related information, identifying the TPS-TC unit, which received the data frames mapped to the respective DTU.

15. A method for interfacing at least one network backbone with at least one network device; the method comprising:
receiving a plurality of data units from the at least one network backbone in accordance with one or more communication protocols; a plurality of data frames, each having a header portion and a payload portion, are generated and each one of the received data units are mapped into one or more payload portions of the plurality of data frames; and
mapping one or more of the plurality of data frames to a payload portion of at least one data transfer unit (DTU); and
communicating the at least one DTU to the at least one network device.

16. The method of claim 15,
wherein the plurality of data frames are received from the at least one network backbone using a plurality of Transport-Protocol-Specific (TPS) Transmission-Convergence Layer (TC) units, wherein each TPS-TC unit is associated with one of the one or more communication protocols.

17. The method of claim 16, wherein the headers of the data frame(s) mapped into the DTU(s) do not include Transport-Protocol-Specific Transmission-Convergence (TPS-TC) information.

\* \* \* \* \*